2,926,750

UNSYMMETRICAL DIMETHYL HYDRAZINE AS A SOLVENT FOR ACETYLENE

William T. Nelson, Bartlesville, Okla., assignor to Phillips Petroleum Company, a corporation of Delaware No Drawing. Application September 6, 1955
Serial No. 532,796

3 Claims. (Cl. 183—115)

This invention relates to the recovery of acetylene from a stream of gases containing the same by employing a selective solvent and to a novel composition of matter thus obtained. In one aspect, it relates to a method for preparing acetylene for storage. In another aspect, it relates to provision of a fuel for reaction motors (e.g., rockets, ram-jets, turbojets) comprising concentrated solutions of acetylene.

Various gaseous streams in refineries frequently contain small percentages of acetylene as compared to the other constituents which may be present, such as hydrogen, methane, ethane, ethylene, nitrogen and higher boiling hydrocarbons. A major problem arises in the separation of the several constituents of such gaseous mixtures and particularly in the concentration and/or separation of acetylene. For the recovery of the acetylene from gaseous mixtures, the selective solvent action of various solvents and mixtures of solvents has been used. The most commonly employed solvent is acetone, however, other solvents such as dialkylformamides, aliphatic lactones, esters of polyhydric alcohols, polyketones, and the like have been either proposed or used. Although these compounds accomplish acetylene removal and recovery, there is yet considerable room for improvement.

An ideal solvent for the selective separation of acetylene should have the properties of high solubility for acetylene, high selectivity for acetylene over the other constituents of the gaseous mixture, high boiling point, high thermal stability, low vapor pressure at ordinary temperatures and absence of chemical reaction with acetylene or other constituents of the gaseous stream.

A liquid having high solvent power for acetylene is also important in the storage of acetylene in pressure retaining vessels. Acetylene is commonly stored in small pressure containers or cylinders which are partially filled with balsa wood or other absorbent and porous material into which the solvent containing dissolved acetylene is introduced under pressure. The higher the solvent power of the solvent for acetylene the larger is the volume of acetylene which can be stored at a given pressure and solvents of high solvent power are therefore desirable.

Acetylene is recognized as an excellent fuel for many purposes. One of the problems attendant with the use of large volumes of acetylene as a fuel is the storage problem because acetylene is a gas under normal atmospheric conditions. Applications involving large quantities of acetylene require voluminous storage facilities. As is known, the storage of acetylene gas under super-atmospheric pressures is a hazardous operation. For this reason acetylene is ordinarily stored as a solution in a suitable solvent. A solvent having a great affinity for acetylene should be employed. Preferably, the solvent also should be a satisfactory fuel when the solution is to be used as a fuel. In such applications, acetylene acts as a combustion and burning rate improver of the solvent. Acetylene is especially useful as a rocket or jet fuel because of its high total energy content and its high flame velocity relative to other hydrocarbons. However, practical use of acetylene as a fuel in aircraft has not been made because of the fact that it is difficult to carry practical quantities of this fuel in the aircraft.

An object of my invention is to provide a novel selective solvent for the separation and recovery of acetylene from gaseous mixtures.

Another object of my invention is to provide an improved method for preparing acetylene for storage.

Still another object of my invention is to provide a new composition of matter comprising acetylene as one component which composition is suitable for use as a reaction motor fuel, such as a rocket propellant.

I achieve these and other objects and advantages by providing a hydrazine as a selective solvent for the separation of acetylene from gaseous mixtures, providing a solution of acetylene in a hydrazine as a safe and suitable composition for the storage of acetylene and by employing such a solution as a rocket fuel having improved flame stability and efficient combustion.

In accordance with the present invention, I have discovered that hydrazines having the following structural formula,

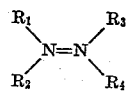

wherein $R_1$, $R_2$, $R_3$, $R_4$ are hydrogen or alkyl groups having one to three carbon atoms per group, are effective selective solvents for acetylene. The acetylene solvents of my invention include the compound hydrazine

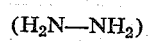

and the mono-, di-, tri-, and tetra-alkyl derivatives of hydrazine. The dialkyl derivatives are the symmetrical and the unsymmetrical hydrazines. The alkyl radicals preferably contain one to three carbon atoms per radical, such as methyl, ethyl, normal propyl, and isoproyl. Unsymmetrical dimethylhydrazine is preferred as a selective solvent for acetylene according to my invention. In addition to hydrazine and unsymmetrical dimethylhydrazine, unsymmetrical diethylhydrazine, unsymmetrical di-normal propylhydrazine, and unsymmetrical di-isopropylhydrazine are employed in the selective extraction of acetylene from gaseous mixtures and as the solvents for acetylene storage. In addition to the above-mentioned unsymmetrical hydrazines, other unsymmetrical hydrazines are also used, such as, unsymmetrical methylethylhydrazine, unsymmetrical methyl-n-propylhydrazine, unsymmetrical methyl-i-propylhydrazine, unsymmetrical ethyl-n-propylhydrazine, unsymmetrical ethyl-i-propylhydrazine and unsymmetrical n-propyl-i-propylhydrazine. Furthermore, symmetrical substituted hydrazines are also used, such as symmetrical dimethylhydrazine, symmetrical diethylhydrazine, symmetrical di-n-propylhydrazine, and symmetrical di-i-propylhydrazine. In addition to these aforementioned hydrazines, there are numerous other partially and fully substituted hydrazines which are used in the process and as a composition of my invention. For example, trimethylhydrazine, tetramethylhydrazine and other tri- and tetraalkylhydrazines are also used.

Of these enumerated hydrazines, I prefer to use unsymmetrical dimethylhydrazine as the selective solvent for acetylene and as the solvent in which to storage acetylene.

Water is appreciably soluble in the hydrazines of my invention and likewise, the hydrazines are at least somewhat soluble in water, there being no chemical reaction between the hydrazines and water. Some of the hydrazines and water are mutually soluble in all proportions.

In Table I are given some properties of hydrazine and alkyl substituted hydrazines, and acetone for comparison therewith.

Table I

| Compound | Mol. Wt. | B.P., °C. | F.P., °C. | Solubility in H₂O | Vapor Pressure, mm. Hg 25° C. | Vapor Pressure, mm. Hg 0° C. |
|---|---|---|---|---|---|---|
| Hydrazine | 32.05 | 113.5 | 1.4 | Soluble | 14.38 | 2.69 |
| Methylhydrazine | 46.07 | 87 at 745 mm | <−80 | do | | |
| Ethylhydrazine | 60.08 | 99.5 at 709 mm | | do | | |
| Dimethylhydrazine—Sym | 60.08 | 81 at 747 mm | | do | | |
| Dimethylhydrazine—Unsym | 60.08 | 63.3 | −58 | do | 157 | 47 |
| Diethylhydrazine—Unsym | 88.15 | 96–99 | | do | | |
| Acetone | 58.08 | 56.5 | −94.3 | do | 220 | 68 |

Unsymmetrical dimethylhydrazine has a Tag closed cup flash point of 34° F., a density of 0.782 g./cc. at 25° C. and a heat of combustion of 7.8 Kg.Cal./G. (14,050 B.t.u. per pound). Acetylene has a heat of combustion of 21,449 B.t.u. per pound while acetone has a heat of combustion of about 13,250 B.t.u. per pound.

The capacity of the herein disclosed hydrazines for dissolving acetylene is very high. For unsymmetrical dimethylhydrazine, the capacity for dissolving acetylene is comparable to that of acetone. The solubilities of acetylene in unsymmetrical dimethylhydrazine and in several other solvents of the art are given in Table II.

TABLE II $\alpha$ = Solubility of gas in various solvents; at one atmosphere partial pressure of the gas at the indicated temperature

| Solvents | Acetylene 30° C. | Acetylene 25° C. | Acetylene 5° C. | Acetylene 0° C. | Ethylene 30° C. | Ethylene 25° C. | Ethylene 0° C. |
|---|---|---|---|---|---|---|---|
| Unsymmetrical Dimethylhydrazine | | ¹14 | | 33.4 | | ¹2.2 | 3.3 |
| Acetone | 18.85 | | | 38.5 | 3.0 | | |
| Acetonylacetone | 12 | | 24 | | | | |
| γ-Butyrolactone | 10.8 | | | | | | |

¹ The values were estimated from the solubilities obtained at 0° C.

These solubilities are expressed in terms of the Bunsen coefficient ($\alpha$) which is the milliliters of solute gas calculed at 760 mm. of pressure and 0° C., dissolved per ml. of solvent at one atmosphere partial pressure of solute gas.

The selectivity (ratio of solubilities) of acetone and of unsymmetrical dimethylhydrazine for acetylene over ethylene given in Table III were calculated from the solubilities in Table II.

TABLE III

Selectivity of unsymmetrical dimethylhydrazine and of acetone at one atmosphere partial pressure of gas and at the temperature indicated

| Solvent | $\alpha C_2H_2/\alpha C_2H_4$ at 30° C. | at 25° C. | at 0° C. |
|---|---|---|---|
| Dimethylhydrazine (unsymmetrical) | | 6.4 | 10.1 |
| Acetone | 6.3 | | |

It should be pointed out that at 0° C. unsymmetrical dimethylhydrazine has a considerably higher selectivity for acetylene over ethylene than at 25° C.

In an acetylene recovery operation the acetylene containing stream is subjected to countercurrent vapor-liquid contacting in any suitable absorption tower such as a spray, packed, or bubble-plate tower. The solvent need not be a pure hydrazine compound because it can be a mixture of two or more of the hydrazines herein contemplated, or the solvent can be a mixture of one or more hydrazines with other acetylene solvents or even with liquid materials which have no selective solvent action for acetylene provided, of course, they are chemically inert toward the materials being treated. Normally solid alkyl hydrazines can be used when in solution in an inert solvent. The temperature and pressure employed in many absorption steps can vary over wide limits but very often ordinary temperatures and pressures are used. It is preferable to operate the absorption step at a temperature substantially below the boiling point of the solvent and above the dew-point of the gaseous mixtures at the existing pressure. At very low temperatures for a fixed pressure, the solubility of acetylene is increased but the solubility may be so great that lower selectivity is obtained whereas at high temperatures so little acetylene is dissolved that selectivity is of little consequence. The use of superatmospheric pressure improves the capacity of the solvent for acetylene but such pressures require more expensive equipment. The acetylene selectively absorbed in the solvent along with small amounts of other gases is recovered by either heating the solution to expel the gas, reducing the pressure over the solution to effect a phase separation of the dissolved gas or by using a combination of both features. Thereafter the solvent is cooled, if it has been heated, and is then recirculated to the absorption step.

The high solubility of acetylene in the solvents of my invention makes these solvents useful in processes involving the solution of acetylene. My novel solvents as mentioned above are suitable for the recovery of acetylene from gaseous mixtures, for preparing solutions of acetylene under pressure for storage and for shipment and for other uses for example in chemical reactions where acetylene undergoes reaction in the form of a solution.

In the storage of acetylene, it is merely necessary to dissolve the acetylene in a hydrazine and store the solution in a suitable pressure vessel. In case the storage vessel is portable, it should contain an absorbent such as balsa, but for non-portable or fixed storage, such an absorbent is frequently considered not necessary. Thus, in fixed storage, the acetylene containing solution is merely stored in the vessel under suitable pressure as in the storage of any other liquefield gas. The stored liquid is withdrawn for transportation or use as desired.

A solution of acetylene in, for example, unsymmetrical dimethylhydrazine, or in hydrazine, the former being preferred, is particularly suitable as a fuel for a reaction motor such as a rocket, ram-jet, turbojet, etc. In these applications, acetylene acts as a combustion and burning rate improver. Solutions of acetylene in a hydrazine such as those herein disclosed is particularly useful as a rocket fuel because for example unsymmetrical dimethylhydrazine is capable of dissolving fourteen times its volume of acetylene at 25° C. Acetylene is further known to be very desirable as a fuel for rockets or as a component of jet fuels because of its high total energy content and its high flame velocity relative to other hydrocarbons. However, practical use of acetylene as a fuel in an aircraft has been limited due to the fact that it is difficult to carry practical quantities of acetylene in such craft. In addition, acetylene is very unstable and unless such precautions are taken, it is a dangerous substance, decomposing violently under a variety of circumstances, however, when acetylene is dissolved in a suitable combustible liquid, acetylene as a reaction motor fuel then becomes practical. An additional advantage in the use of acetylene is that the performance of such a fuel as a hydrazine with respect to freezing point and burning characteristics, will also be enhanced. A solution of acetylene in a solvent, such as dimethylhydrazine, can be used as one blending component for fuels used in jet engines. The extremely high flame speed of acetylene exerts a piloting action on the flame and thereby stabilizes combustion of the other components of the fuel. The acetylene-hydrazine solutions of my invention are used either as a mono-propellant or as a fuel in a bi-propellant system. Suitable oxidizers that can be used in a bipropellant system employing the acetylene-hydrazine solutions as the fuel include white (WFNA) or red (RFNA) fuming nitric acids, hydrogen peroxide, ozone, nitrogen tetraoxide, liquid oxygen and mixed mineral acids, especially anhydrous mixtures of nitric and sulfuric acids.

Various modifications of my invention are possible within the scope of the disclosure of the present invention, the essence of which is that hydrazines, such as unsymmetrical dimethylhydrazine, have been discovered to be effective selective solvents for separating acetylene from gaseous mixtures containing for example, methane, ethane, ethylene, carbon dioxide, nitrogen, hydrogen, and higher boiling hydrocarbons. Such solutions of acetylene in the hydrazines because of the great solubility of acetylene in these solvents are especially adaptable to be stored under pressure and such solutions are also suitable as rocket fuels because of the flame stabilizing and high combustion efficiency of acetylene containing solutions such as herein disclosed.

With regard to use of my acetylene solutions in a hydrazine as blending components for fuels such as jet engine fuels or hydrocarbon-base rocket fuels, beneficial effects will be obtained when the amount of solutions blended results in as little as 1 wt. percent of acetylene in the fuel blend.

I prefer to employ concentrated solutions of acetylene in a hydrazine fuel for reaction motors, such as rockets, to obtain maximum beneficial effects of the acetylene. However, beneficial effects of acetylene in this solvent are realized by employing as rocket fuels hydrazine solutions of acetylene containing from about 1% acetylene by weight based on the weight of the hydrazine to a saturated solution of acetylene in the hydrazine under conditions existing in the storage facilities of the rocket in which the fuel is employed.

While certain embodiments of the invention have been described for illustrative purposes, the invention obviously is not limited thereto.

I claim:

1. A solution of acetylene in unsymmetrical dimethylhydrazine.

2. A method for the recovery of acetylene from a gas consisting essentially of acetylene, methane, ethane, ethylene, carbon dioxide, nitrogen and hydrogen which comprises contacting said gas containing acetylene with unsymmetrical dimethylhydrazine.

3. A method for the storage of acetylene comprising dissolving acetylene in unsymmetrical dimethylhydrazine and confining the resulting solution in a storage zone.

References Cited in the file of this patent

UNITED STATES PATENTS

| | | |
|---|---|---|
| 2,357,184 | Frejacques | Aug. 29, 1944 |
| 2,573,471 | Malina et al. | Oct. 30, 1951 |
| 2,587,689 | Box | Mar. 4, 1952 |
| 2,623,611 | Levine et al. | Dec. 30, 1952 |
| 2,659,453 | Robinson | Nov. 17, 1953 |
| 2,729,936 | Britton | Jan. 10, 1956 |
| 2,795,322 | Nelson | June 11, 1957 |
| 2,811,431 | Zwicky et al. | Oct. 29, 1957 |

OTHER REFERENCES

"The Condensed Chemical Dictionary," 4th edition, 1950, Reinhold Publishing Co., page 346.